US012368317B2

(12) United States Patent
Yu et al.

(10) Patent No.: US 12,368,317 B2
(45) Date of Patent: Jul. 22, 2025

(54) ENERGY STORAGE APPARATUS, ENERGY STORAGE APPARATUS CONTROL METHOD, AND PHOTOVOLTAIC SYSTEM

(71) Applicant: Huawei Digital Power Technologies Co., Ltd., Guangdong (CN)

(72) Inventors: Shijiang Yu, Shanghai (CN); Zhipeng Wu, Shenzhen (CN); He Zhou, Shanghai (CN); Lei Shi, Shanghai (CN); Yang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 18/401,455

(22) Filed: Dec. 30, 2023

(65) Prior Publication Data

US 2024/0136850 A1 Apr. 25, 2024
US 2024/0235252 A9 Jul. 11, 2024

Related U.S. Application Data

(63) Continuation of application No. PCT/CN2022/101667, filed on Jun. 27, 2022.

(30) Foreign Application Priority Data

Jun. 30, 2021 (CN) ......................... 202110732769.2

(51) Int. Cl.

| | |
|---|---|
| ***H02J 9/06*** | (2006.01) |
| ***H02J 3/00*** | (2006.01) |
| ***H02J 3/32*** | (2006.01) |
| ***H02J 7/35*** | (2006.01) |

(52) U.S. Cl.

CPC ............ *H02J 9/068* (2020.01); *H02J 3/0012* (2020.01); *H02J 3/32* (2013.01); *H02J 7/35* (2013.01); *H02J 9/061* (2013.01); *H02J 2207/20* (2020.01); *H02J 2300/24* (2020.01)

(58) Field of Classification Search

None

See application file for complete search history.

(56) References Cited

FOREIGN PATENT DOCUMENTS

| | | | |
|---|---|---|---|
| CN | 204668965 | U | 9/2015 |
| CN | 106788140 | A | 5/2017 |
| CN | 105515046 | B | 6/2019 |
| CN | 112636435 | A | 4/2021 |
| CN | 113629757 | A | 11/2021 |

*Primary Examiner* — Robert L Deberadinis

(57) ABSTRACT

This disclosure provides an energy storage apparatus, an energy storage apparatus control method, and a photovoltaic system. The energy storage apparatus includes: a plurality of battery clusters, a plurality of conversion units, a start unit, and a controller. The controller includes a plurality of control units. The start unit is configured to: after receiving a start signal, control a control switch in at least one battery cluster to close, to start a control unit corresponding to the battery cluster. The control unit is configured to: determine, based on a state of the control switch in the battery cluster, whether a black start mode is on; and when determining that the black start mode is on, control a DC-DC converter in the corresponding conversion unit to release electric energy stored in a battery pack in the corresponding battery cluster, to energize a direct current bus.

12 Claims, 12 Drawing Sheets

ENERGY STORAGE APPARATUS, ENERGY STORAGE APPARATUS CONTROL METHOD, AND PHOTOVOLTAIC SYSTEM

CROSS-REFERENCE TO RELATED APPLICATIONS

This disclosure is a continuation of International Application No. PCT/CN2022/101667, filed on Jun. 27, 2022, which claims priority to Chinese Patent Application No. 202110732769.2 filed on Jun. 30, 2021. The disclosures of the aforementioned applications are hereby incorporated by reference in their entireties.

TECHNICAL FIELD

This disclosure relates to the field of black start technologies, and specifically, to an energy storage apparatus, an energy storage apparatus control method, and a photovoltaic system.

BACKGROUND

As new-energy power generation systems are used more widely in the world, stability of the new-energy power generation systems has been taken seriously. An energy storage apparatus may store excess electric energy when an electric energy yield of the new-energy power generation system exceeds electricity demands of powered devices or power grids, and provide the stored excess electric energy to the powered devices or the power grids when the electric energy yield of the new-energy power generation system is less than the electricity demands of the powered devices or the power grids, to implement power supply stability of the new-energy power generation system. Therefore, the energy storage apparatus is also widely applied to new-energy power generation systems.

As common new-energy power generation systems, off-grid systems are increasingly applied to areas without large power grids, such as remote areas or islands. For example, a photovoltaic system is one type of the off-grid systems. Electric energy generated by the photovoltaic system may be output to a power grid or directly supplied to a powered device. When the powered device or the power grid is powered off, the off-grid system is automatically disconnected from the power grid. Therefore, if a black start needs to be implemented, a connection between the off-grid system and the powered device needs to be recovered. A common black start manner of the off-grid system is as follows: An auxiliary power supply apparatus is configured in the off-grid system. When the powered device or the power grid is powered off, the auxiliary power supply apparatus supplies power to a controller in the off-grid system. After the controller is powered on, a connection between the off-grid system and the power grid can be implemented, and power supply to the powered device or the power grid can be restored. However, in such a start manner, a new device (for example, the auxiliary power supply apparatus) needs to be configured in the off-grid system, and overall costs of the system are increased.

SUMMARY

The embodiments of the present disclosure provide an energy storage apparatus, an energy storage apparatus control method, and a photovoltaic system, so that when a powered device or a power grid is powered off, a black start can be implemented without adding an additional device, thereby reducing costs of the photovoltaic system.

According to a first aspect, this disclosure provides an energy storage apparatus, where the energy storage apparatus is configured to supply power to a power grid, and the energy storage apparatus includes: a plurality of battery clusters, a plurality of conversion units, a start unit, and a controller. The power grid is configured to supply power to the controller, the controller includes a plurality of control units, the plurality of battery clusters are in a one-to-one correspondence with the plurality of control units and the plurality of conversion units, and each battery cluster is connected to a corresponding conversion unit. Each battery cluster includes a battery pack and a control switch. Each conversion unit includes a direct current to direct current (DC-DC) converter, and each DC-DC converter is connected to a direct current bus. The start unit is configured to: after receiving a start signal, control the control switch in at least one of the plurality of battery clusters to close, to start a control unit corresponding to the at least one battery cluster. Any one of the plurality of control units is configured to: determine, based on a state of the control switch in the corresponding battery cluster, whether a black start mode is on, where the black start mode is a mode in which power supply to the power grid needs to be restored after the power grid is powered off; and when determining that the black start mode is on, control the DC-DC converter in the corresponding conversion unit to release electric energy stored in the battery pack in the corresponding battery cluster, to energize the direct current bus.

Based on a structure of the energy storage apparatus, when a powered device or the power grid that is connected to a photovoltaic system is powered off, the energy storage apparatus may control, through a start, the control switch in the at least one battery cluster to close, and when the control switch is closed, determine that the black start mode is on. The control unit controls the DC-DC converter in the corresponding conversion unit to release the electric energy stored in the battery pack in the corresponding battery cluster, to energize the direct current bus. Finally, the entire energy storage apparatus is enabled to normally work, so that power supply to the power grid is restored. In this way, a black start is implemented without adding an additional device.

In a possible implementation, each of the plurality of battery clusters further includes: a first auxiliary power supply. In each battery cluster, a first electrode of the control switch is connected to one end of the first auxiliary power supply, a second end of the battery pack is connected to the other end of the first auxiliary power supply, the first electrode of the control switch is further connected to the start unit, a second electrode of the control switch is separately connected to a first end of the battery pack and the start unit, and a control electrode of the control switch is connected to the first auxiliary power supply. The first auxiliary power supply in any one of the plurality of battery clusters is configured to: after the control switch in the battery cluster is closed, supply power to a battery management unit in the control unit corresponding to the battery cluster.

Based on the foregoing design, the first auxiliary power supply may be connected to the battery pack by using the start unit. In this case, the battery pack transmits electric energy to the first auxiliary power supply, and the first auxiliary power supply generates an electrical signal. The battery management unit detects the electrical signal on the first auxiliary power supply, and after determining that the detected electrical signal lasts for specified duration, controls the first auxiliary power supply to close the control electrode of the control switch. The battery management unit detects a closed state of the control switch, to implement a black start without adding an additional device.

In a possible implementation, each control unit includes the battery management unit BMU. Any battery management unit in the plurality of control units is configured to: detect the state of the control switch in the battery cluster corresponding to the control unit; determine whether the black start mode is on; and when the control switch in the battery cluster corresponding to the control unit is closed, determine that the black start mode is on.

Based on the foregoing design, to implement safety, the BMU is disposed in each battery cluster, and the BMU may detect an electrical signal flowing on the first auxiliary power supply and the state of the control switch, and supply power to the control unit based on whether the detected electrical signal is within the specified duration, thereby improving power supply safety.

In a possible implementation, each conversion unit further includes a second auxiliary power supply; the first auxiliary power supply in any one of the plurality of battery clusters is connected to the second auxiliary power supply in the conversion unit corresponding to the battery cluster; each control unit includes a battery control unit BCU; the first auxiliary power supply in any one of the plurality of battery clusters is further configured to start the second auxiliary power supply in the conversion unit corresponding to the battery cluster; the second auxiliary power supply in any one of the plurality of conversion units is configured to supply power to the battery control unit in the control unit corresponding to the battery cluster; any battery control unit in the plurality of control units is configured to: when determining that the black start mode is on, control the DC-DC converter in the conversion unit corresponding to the battery cluster to release the electric energy stored in the battery pack in the corresponding battery cluster, to energize the direct current bus.

In a possible implementation, the battery control unit in each control unit communicates with the battery management unit in at least one of the following manners: a wired local area network LAN, a serial bus, a controller area network CAN and a power line carrier PLC, a general packet radio service GPRS, a wireless network Wi-Fi, Bluetooth, ZigBee, and infrared.

In a possible implementation, the energy storage apparatus further includes a plurality of power conversion systems PCSs, where the plurality of power conversion systems are in a one-to-one correspondence with the plurality of conversion units; any one of the plurality of conversion units is mutually connected to any one of the plurality of power conversion systems through the direct current bus.

In a possible implementation, the energy storage apparatus further includes a plurality of on/off grid cabinets, a plurality of third auxiliary power supplies, and a plurality of system control unit (SCU). The plurality of power conversion systems are in a one-to-one correspondence with the plurality of on/off grid cabinets, the plurality of third auxiliary power supplies, and the plurality of system control unit SCUs. Any one of the plurality of third auxiliary power supplies is configured to obtain power from the direct current bus to start the monitoring unit corresponding to the power conversion system. Any battery control unit in the plurality of control units is further configured to: when determining that the black start mode is on, control the DC-DC converter in the conversion unit corresponding to the battery cluster to generate a disturbance signal at a specified frequency on the direct current bus. Any one of the plurality of system control unit is configured to: detect the disturbance signal on the direct current bus and a working state of the on/off grid cabinet corresponding to the power conversion system; and when the disturbance signal at the specified frequency is detected on the direct current bus and the on/off grid cabinet corresponding to the power conversion system is in a normal working state, start the power conversion system and the on/off grid cabinet corresponding to the power conversion system.

Based on the foregoing design, in a scenario in which the battery control unit cannot communicate with the monitoring unit, the battery control unit may be further configured to: when determining that the black start mode is on, control the DC-DC converter in the corresponding conversion unit to generate the disturbance signal at the specified frequency on the direct current bus; after the monitoring unit receives a voltage disturbance from the bus, decode the voltage disturbance from the bus, to determine that the black start mode is on.

In a possible implementation, the start unit includes a button switch, where the button switch is connected in parallel to any one or more of control switches in the plurality of battery clusters.

The start signal received by the start unit may be a signal for which pressing duration is longer than the specified duration and a pressure value of pressing is greater than a specified pressure value. Based on the foregoing design, a volume and costs of the energy storage apparatus are reduced.

According to a second aspect, this disclosure provides a photovoltaic system, where the photovoltaic system includes: a plurality of photovoltaic modules, a direct current to direct current DC-DC converter, a direct current to alternating current DC-AC converter, a control module, and the energy storage apparatus according to any implementation of the first aspect. The plurality of photovoltaic modules are connected to the DC-DC converter, and the plurality of photovoltaic modules are configured to: convert optical energy into a first direct current, and output the first direct current to the DC-DC converter. The DC-DC converter is separately connected to the DC-AC converter and the energy storage apparatus, and the DC-DC converter is configured to: convert the first direct current into a second direct current, and separately output the second direct current to the DC-AC converter and the energy storage apparatus. The energy storage apparatus is connected to the control module, and the energy storage apparatus is configured to supply power to the control module. The DC-AC converter is configured to: convert the second direct current into a first alternating current, and output the first alternating current. For technical effects of the corresponding solution in the second aspect, refer to the technical effects that may be obtained according to the corresponding solution in the first aspect. Repeated descriptions are not provided herein again.

The control module is separately connected to the DC-DC converter and the DC-AC converter, and the control module is configured to control a working state of the DC-DC converter and a working state of the DC-AC converter.

In a possible implementation, the control module is further configured to control a working state of the energy storage apparatus.

According to a third aspect, this disclosure provides an energy storage apparatus control method, applied to an energy storage apparatus. The energy storage apparatus includes: a plurality of battery clusters, a plurality of conversion units, a start unit, and a controller. The method includes: after receiving a start signal, controlling a control switch in at least one of the plurality of battery clusters to close, to start a control unit corresponding to the battery cluster; determining, based on a state of the control switch in the corresponding battery cluster, whether a black start mode is on, where the black start mode is a mode in which power supply to a power grid needs to be restored after the power grid is powered off; and when determining that the black start mode is on, controlling a DC-DC converter in the corresponding conversion unit to release electric energy stored in a battery pack in the corresponding battery cluster, to energize a direct current bus. For technical effects of the corresponding solution in the third aspect, refer to the technical effects that may be obtained according to the corresponding solution in the first aspect. Repeated descriptions are not provided herein again.

In a possible implementation, the energy storage apparatus further includes a plurality of on/off grid cabinets, a plurality of third auxiliary power supplies, and a plurality of system control unit SCUs. A plurality of power conversion systems are in a one-to-one correspondence with the plurality of on/off grid cabinets, the plurality of third auxiliary power supplies, and the plurality of system control unit SCUs. The method further includes: detecting a disturbance signal on the direct current bus and a working state of the on/off grid cabinet corresponding to the power conversion system; and when the disturbance signal at a specified frequency is detected on the direct current bus and the on/off grid cabinet corresponding to the power conversion system is in a normal working state, starting the power conversion system and the on/off grid cabinet corresponding to the power conversion system.

These aspects or other aspects of this disclosure are clearer and more comprehensible in descriptions of the following embodiments.

DESCRIPTION OF EMBODIMENTS

Figure 1:
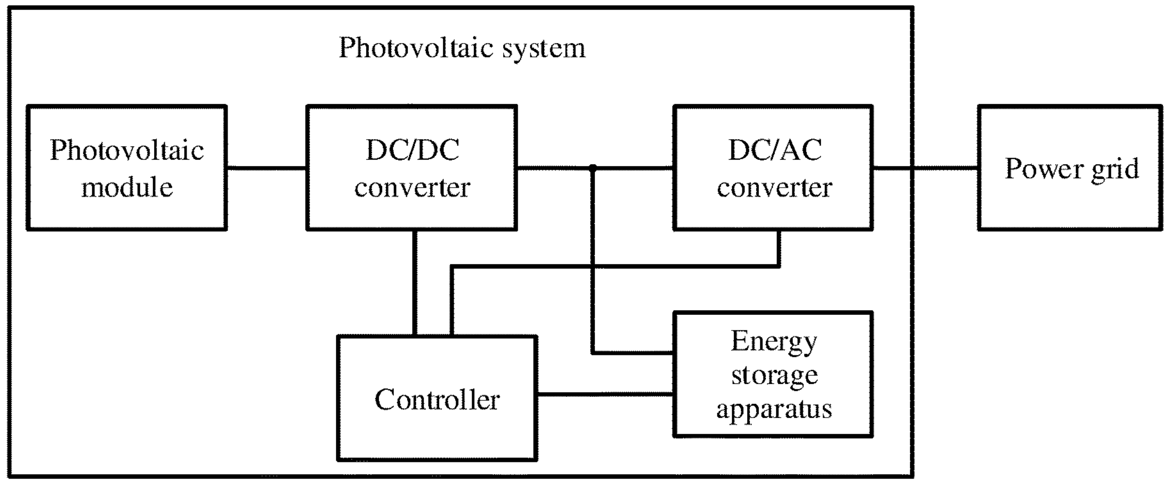
FIG. 1 is a schematic diagram of a structure of a photovoltaic system.

The following describes some terms in embodiments of this disclosure to help a person skilled in the art have a better understanding.

(1) A battery management unit (BMU) is configured to: monitor a voltage, a temperature, and other information of an energy storage battery in an energy storage system, and report the foregoing information to a battery control unit (BCU) through a communications bus, so that the battery control unit monitors and adjusts the energy storage battery in the battery management system based on the foregoing information reported by the battery management unit.

To make objectives, technical solutions, and advantages of this disclosure clearer, the following further describes this disclosure in detail with reference to the accompanying drawings. A specific operation method in a method embodiment may also be applied to an apparatus embodiment or a system embodiment. It should be noted that, in the descriptions of this disclosure, "a plurality" refers to two or more. In view of this, in embodiments of this disclosure, "a plurality of" may also be understood as "at least two". In addition, it should be understood that, in descriptions of this disclosure, terms such as "first" and "second" are merely used for distinguishing and description, but should not be understood as an indication or implication of relative importance, or an indication or implication of a sequence.

It should be noted that a "connection" in embodiments of this disclosure means an electric connection, and a connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

It should be noted that a switch in embodiments of this disclosure may be one or more types of a plurality of types of switching devices such as a relay, a metal oxide semiconductor field effect transistor (MOSFET), a bipolar junction transistor (BJT), an insulated gate bipolar transistor (GBT), and a gallium nitride (GaN) power transistor. Details are not described in embodiments of this disclosure again. Each switching device may include a first electrode, a second electrode, and a control electrode, where the control electrode is configured to control turn-on or turn-off of the switch. When the switch is turned on, a current may be transmitted between the first electrode and the second electrode of the switch. When the switch is turned off, a current cannot be transmitted between the first electrode and the second electrode of the switch. The MOSFET is used as an example. The control electrode of the switch is a gate, the first electrode of the switch may be a source of the switching device, and the second electrode may be a drain of the switching device. Alternatively, the first electrode may be a drain of the switch, and the second electrode may be a source of the switch.

An energy storage apparatus provided in this disclosure may be applied to a photovoltaic system. FIG. 1 is a schematic diagram of a structure of a photovoltaic system according to an embodiment of this disclosure. As shown in FIG. 1, the photovoltaic system includes a plurality of photovoltaic modules, a direct current (DC) to direct current converter (a DC-DC converter), a direct current to alternating current (AC) converter (a DC-AC converter), an energy storage apparatus, and a control module. During actual use, the photovoltaic system may be connected to a power grid, and transmit generated electric energy to the power grid. Alternatively, the photovoltaic system may be directly connected to a powered device, and directly supply generated electric energy to the powered device.

The plurality of photovoltaic modules are connected to the DC-DC converter, and the plurality of photovoltaic modules are configured to: convert optical energy into a first direct current, and output the first direct current to the DC-DC converter. The energy storage apparatus is connected between the DC-DC converter and the DC-AC converter, and the DC-DC converter may convert the received first direct current into a second direct current. The energy storage apparatus can store excess electric energy when electric energy that is output by the DC-DC converter exceeds an electric energy demand of the power grid or a demand of the powered device, and output the stored electric energy to the power grid by using the DC-AC converter when the electric energy that is output by the DC-DC converter falls short of the electric energy demand. The DC-AC converter is connected to the power grid. The DC-AC converter may convert the received direct current into an alternating current and output the alternating current to the power grid. In addition, a transformer may further be connected between the photovoltaic system and the power grid, and the transformer boosts the alternating current provided by the photovoltaic system, to implement high-voltage transmission and the like. This should be known by a person skilled in the art, and is not limited in this disclosure.

During actual application, the power grid usually supplies power to the control module. When the power grid connected to the control module is powered off due to a failure, routine maintenance, or the like, the photovoltaic system directly considers by default that a failure occurs at this time, and stops supplying power to a controller. The controller is configured to control the DC-DC converter, the DC-AC converter, and the energy storage apparatus. After the powered device or the power grid is troubleshot, power supply to the controller needs to be restored, so that the energy storage apparatus or the photovoltaic module in the photovoltaic system resupplies power to the power grid, thereby implementing a black start.

Figure 2:
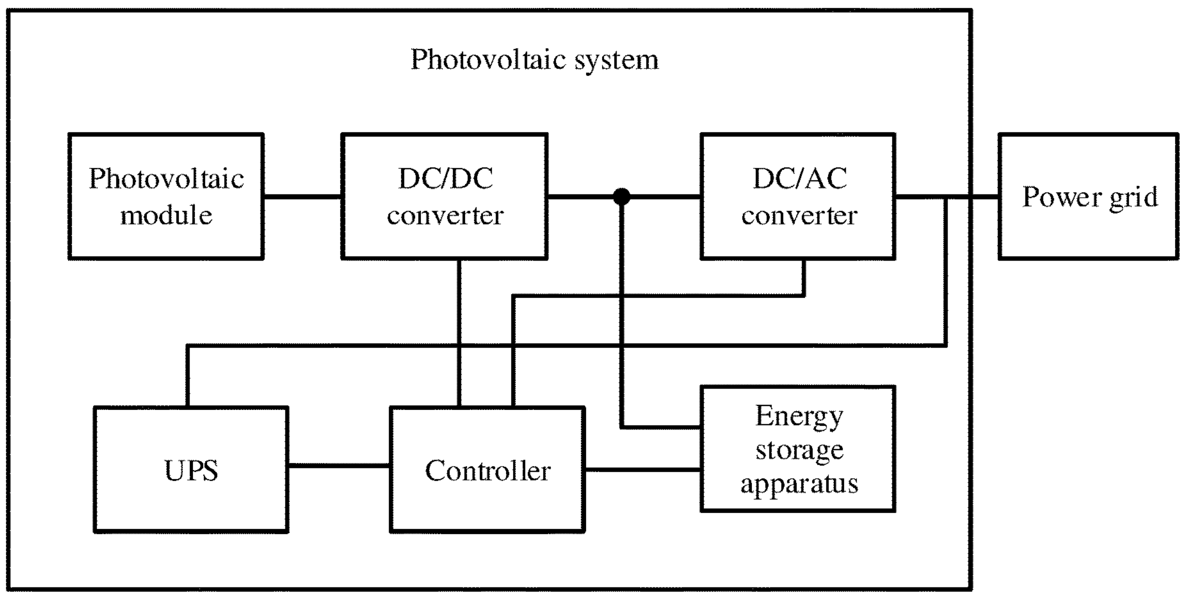
FIG. 2 is a schematic diagram of a structure of a photovoltaic system including a UPS.

Currently, a common black start manner is to dispose an uninterruptible power supply (UPS) in the photovoltaic system. As shown in FIG. 2, the UPS is separately connected to the power grid and the controller, and is configured to: before the power grid is powered off, store electric energy transmitted on the power grid, and when the power grid is powered off, supply electric energy stored in the UPS to the controller. After power supply to the controller is restored, the controller re-controls the DC-DC converter, the DC-AC converter, and the energy storage apparatus to normally work, and resupplies the generated electric energy to the power grid, to implement a black start. In addition, during actual use, the UPS may further include a power supply module, and the UPS may restore power supply to the controller by using the power supply module. When the foregoing black start manner is actually used, the new device UPS needs to be added to the photovoltaic system, and a volume and costs of the photovoltaic system are increased. Because the electric energy stored in the UPS is not highly frequently used, electric energy utilization of the entire photovoltaic system is further reduced. In addition, the power supply module needs to be additionally configured for the UPS, and this leads to high costs and a short lifetime.

In view of this, this disclosure provides an energy storage apparatus, an energy storage apparatus control method, and a photovoltaic system, so that the photovoltaic system implements a black start by using a battery of the photovoltaic system without adding an additional power supply, thereby reducing costs of the photovoltaic system.

Figure 3:
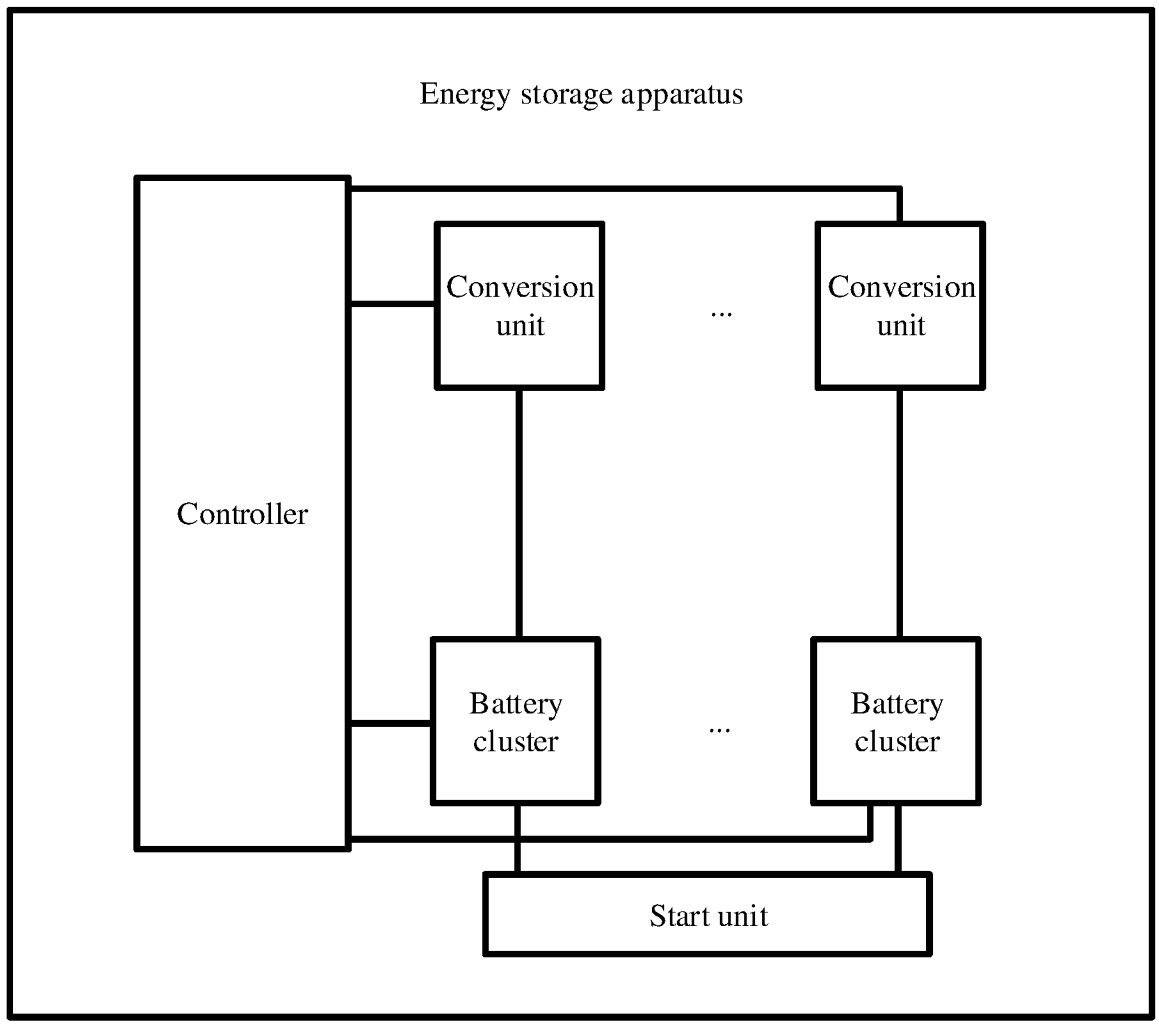
FIG. 3 is a schematic diagram of a structure of an energy storage apparatus.

FIG. 3 is a schematic diagram of a structure of an energy storage apparatus. As shown in FIG. 3, the energy storage apparatus provided in this embodiment of this disclosure includes a plurality of battery clusters, a plurality of conversion units, a start unit, and a controller. The energy storage apparatus is configured to supply power to a power grid. The power grid is configured to supply power to the controller. The energy storage apparatus includes the plurality of battery clusters, the plurality of conversion units, the start unit, and the controller. The controller includes a plurality of control units, the plurality of battery clusters are in a one-to-one correspondence with the plurality of control units and the plurality of conversion units, the plurality of battery clusters are in a one-to-one correspondence with the plurality of conversion units, and each battery cluster is connected to a corresponding conversion unit. Each battery cluster includes a battery pack and a control switch. Each conversion unit includes a direct current to direct current DC-DC converter, and each DC-DC converter is connected to a direct current bus. The start unit is configured to: after receiving a start signal, control the control switch in at least one of the plurality of battery clusters to close, to start a control unit corresponding to the at least one battery cluster corresponding to the control switch. Any one of the plurality of control units is configured to determine, based on a state of the control switch in the corresponding battery cluster, whether a black start mode is on, where the black start mode is a mode in which power supply to the power grid needs to be restored after the power grid is powered off or power supply to a system is restored by using the power grid; and when determining that the black start mode is on, control the DC-DC converter in the corresponding conversion unit to convert electric energy stored in the battery pack in the corresponding battery cluster into a target voltage for output and release, to energize the direct current bus.

In a practical application scenario, the energy storage apparatus may be fixed on a photovoltaic system. Alternatively, the energy storage apparatus may be flexible and detachable. That is, a fixed connection interface is provided on the photovoltaic system, and the energy storage apparatus may be connected to the photovoltaic system through the fixed connection interface.

The battery pack in the battery cluster may be a single storage battery, or may be a storage battery cluster formed by a plurality of storage batteries. Specifically, the storage battery may be a combination of one or more of a lead-carbon battery, a lithium iron phosphate battery, a ternary lithium battery, a sodium-sulfur battery, and a flow battery. The battery pack may be flexibly selected based on an actual application environment, a cost budget, and the like.

The DC-DC converter included in the conversion unit is configured to: when electric energy generated by a photovoltaic module in the photovoltaic system exceeds an electric energy demand of the power grid, convert a received first direct current into a second direct current, and input the second direct current into the battery cluster in the energy storage apparatus, so that the battery cluster stores excess electric energy; and when the electric energy generated by the photovoltaic module falls short of an electric energy demand of a powered device, convert a second direct current generated by the battery cluster into a first direct current, and output the first direct current to the power grid. In addition, a transformer and a DC-AC converter may be further connected between the conversion unit and the power grid, the DC-AC converter may convert the received direct current into an alternating current and output the alternating current to the power grid, and the transformer boosts the alternating current provided by the photovoltaic system, to implement high-voltage transmission and the like. This should be known by a person skilled in the art, and is not limited in this disclosure. In addition, to enable the direct current bus in the photovoltaic system to be slowly started, the DC-DC converter may release the electric energy stored in the battery pack in the corresponding battery cluster, so that the direct current bus is energized. Specifically, the DC-DC converter may convert the electric energy stored in the battery pack in the corresponding battery cluster into the target voltage. The target voltage is less than a normal working voltage of the direct current bus.

The controller may include a plurality of control units. The plurality of control units are also in a one-to-one correspondence with the plurality of conversion units. The control unit may be a general-purpose central processing unit (CPU), a general-purpose processor, digital signal processor (DSP), an application-specific integrated circuit (ASIC), a field programmable gate array (FPGA) or another programmable logic device, a transistor logic device, a hardware component, or any combination thereof. The control unit may implement or execute logical blocks, modules, and circuits in various examples described with reference to content disclosed in this disclosure. The processor may be a combination of processors implementing a computing function, for example, a combination including one or more microprocessors, or a combination of a DSP and a microprocessor.

Specific structures of the plurality of battery clusters, the start unit, and the controller in the energy storage apparatus are described below.

In a possible implementation, each battery cluster further includes a first auxiliary power supply. In each battery cluster, a first electrode of the control switch is connected to one end of the first auxiliary power supply, a second end of the battery pack is connected to the other end of the first auxiliary power supply, the first electrode of the control switch is further connected to the start unit, a second electrode of the control switch is separately connected to a first end of the battery pack and the start unit, and a control electrode of the control switch is connected to the first auxiliary power supply. The first auxiliary power supply in any one of the plurality of battery clusters is configured to: after the control switch in the battery cluster is closed, supply power to a battery management unit in the control unit corresponding to the battery cluster.

Each control unit includes the battery management unit BMU. Any battery management unit in the plurality of control units is configured to: detect the state of the control switch in the battery cluster corresponding to the control unit; determine whether the black start mode is on; and when the control switch in the battery cluster corresponding to the control unit is closed, determine that the black start mode is on.

After the power grid is powered off, the start signal is triggered, and the start unit controls the control switch in at least one of the battery clusters to close, to start the first auxiliary power supply. A conduction path is formed between the first auxiliary power supply and the battery management unit, so that the first auxiliary power supply supplies power to the battery management unit in the corresponding control unit.

In this case, the battery management unit detects an electrical signal on the first auxiliary power supply. After determining that the detected electrical signal lasts for specified duration, the battery management unit controls the first auxiliary power supply to close the control switch. In this case, the battery management unit detects a closed state of the control switch again. When the control switch is closed, the battery management unit determines that the black start mode is on, that is, determines that the power grid is currently powered off, and power supply to the power grid needs to be restored.

In a possible implementation, when the battery pack does not need to store or release the electric energy, the first auxiliary power supply may be further controlled by using the battery management unit, so that the first auxiliary power supply is enabled to control the control switch, to disconnect the battery pack from the first auxiliary power supply, thereby preventing the first auxiliary power supply from consuming the electric energy stored in the battery pack.

In addition, the control switch included in each battery cluster may further be a linked switch. Due to a structure of the linked switch, after a control switch is closed, a control switch in each of the other battery clusters may be driven to close together, to supply power to the first auxiliary power supply in each battery cluster, so that the photovoltaic system enters a black start mode as a whole.

Figure 4:
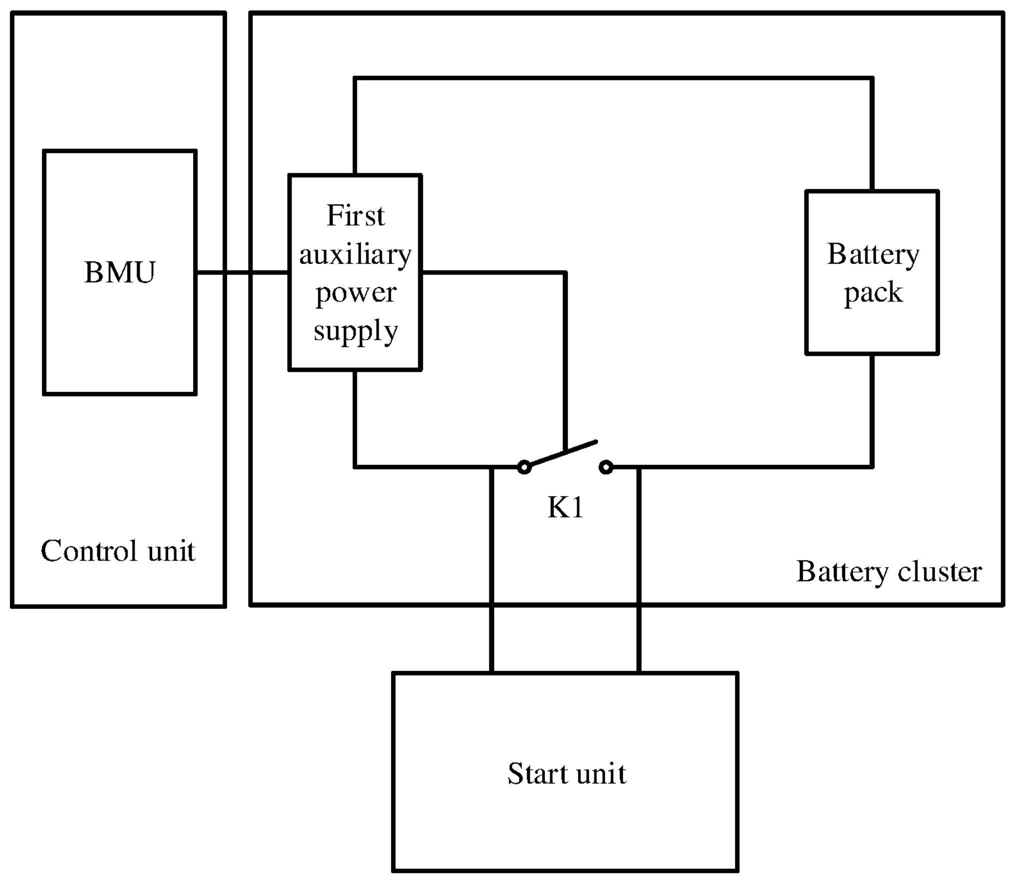
FIG. 4 is a schematic diagram of a structure of a battery cluster.

With reference to FIG. 4, for ease of understanding, a specific example of the structure of the battery cluster is described below.

FIG. 4 is a schematic diagram of a structure of a battery cluster according to an embodiment of this disclosure. In FIG. 4, a plurality of batteries constitute a battery pack, K1 is a control switch, and a BMU is a battery management unit.

A connection relationship of devices in the battery cluster shown in FIG. 4 may be as follows: A first auxiliary power supply is connected to the battery management unit, a first end of the first auxiliary power supply is connected to a first electrode of K1, a second end of the first auxiliary power supply is connected to a second end of the battery pack, a second electrode of K1 is connected to a first end of the battery pack, and a control electrode of K1 is connected to a start unit.

After the start unit receives a start signal, a conduction path is formed between the battery pack and the first auxiliary power supply by using the start unit. In this case, the battery pack transmits electric energy to the first auxiliary power supply, and the first auxiliary power supply generates an electrical signal. The battery management unit detects the electrical signal on the first auxiliary power supply, and after determining that the detected electrical signal lasts for specified duration, controls the first auxiliary power supply to close the control electrode of the control switch. The battery management unit detects a closed state of the control electrode again, and when K1 is closed, determines that a black start mode is on. Certainly, the foregoing descriptions of the structure of the battery cluster are only an example. In practical application, because of different closed forms of the control switch, another structure may alternatively be used inside the battery cluster.

For ease of understanding, a specific example of the structure of the start unit is described below. The start unit is connected to a plurality of battery clusters, so that the start unit receives the start signal when the power grid is disconnected due to a failure, thereby forming the conduction path between the first auxiliary power supply in a battery module and the battery pack, to implement a black start.

Figure 5:
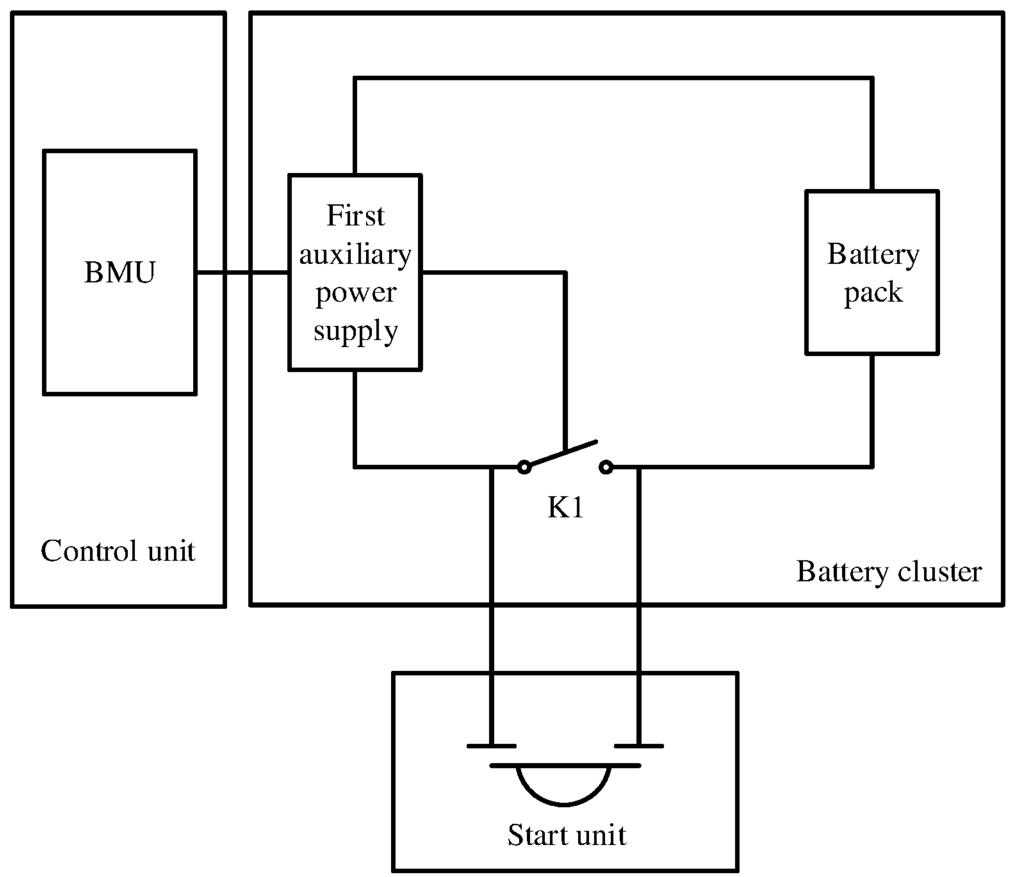
FIG. 5 is a schematic diagram of a structure of a start unit.

FIG. 5 is a schematic diagram of a structure of a start unit. As shown in FIG. 5, to reduce a volume and costs of an energy storage apparatus, the start unit includes a button switch, and the button switch is connected in parallel to any one or more of control switches in a plurality of battery clusters. A start signal received by the start unit may be a signal for which pressing duration is longer than specified duration and a pressure value of pressing is greater than a specified pressure value.

In a possible implementation, the start unit may further include a plurality of button switches in a one-to-one correspondence with the plurality of battery clusters.

Each button switch is connected in parallel to the control switch in the corresponding battery cluster. During actual use, a plurality of second button switches may be adjacent or located at different locations. A first auxiliary power supply in each battery cluster may send a control signal to any control switch. Therefore, when any second button switch receives the start signal, the control switch in the corresponding battery cluster may be closed after receiving the control signal, and the control switch is closed after the first auxiliary power supply is energized. Certainly, the foregoing descriptions of the structure of the start unit are only an example, and in practical application, the start unit may alternatively use another structure. For example, the switch in the start unit may be a contactor switch, a magnetic switch, or the like.

In a possible implementation, each conversion unit further includes a second auxiliary power supply. The first auxiliary power supply in any one of the plurality of battery clusters is connected to the second auxiliary power supply in the conversion unit corresponding to the battery cluster. Each control unit includes a battery control unit (BCU).

The first auxiliary power supply in any one of the plurality of battery clusters is further configured to start the second auxiliary power supply in the conversion unit corresponding to the battery cluster; the second auxiliary power supply in any one of the plurality of conversion units is configured to supply power to the battery control unit in the control unit corresponding to the battery cluster; any battery control unit in a plurality of control units is configured to: when determining that the black start mode is on, control a DC-DC converter in the conversion unit corresponding to the battery cluster to release electric energy stored in a battery pack in the corresponding battery cluster, to energize a direct current bus.

Figure 6:
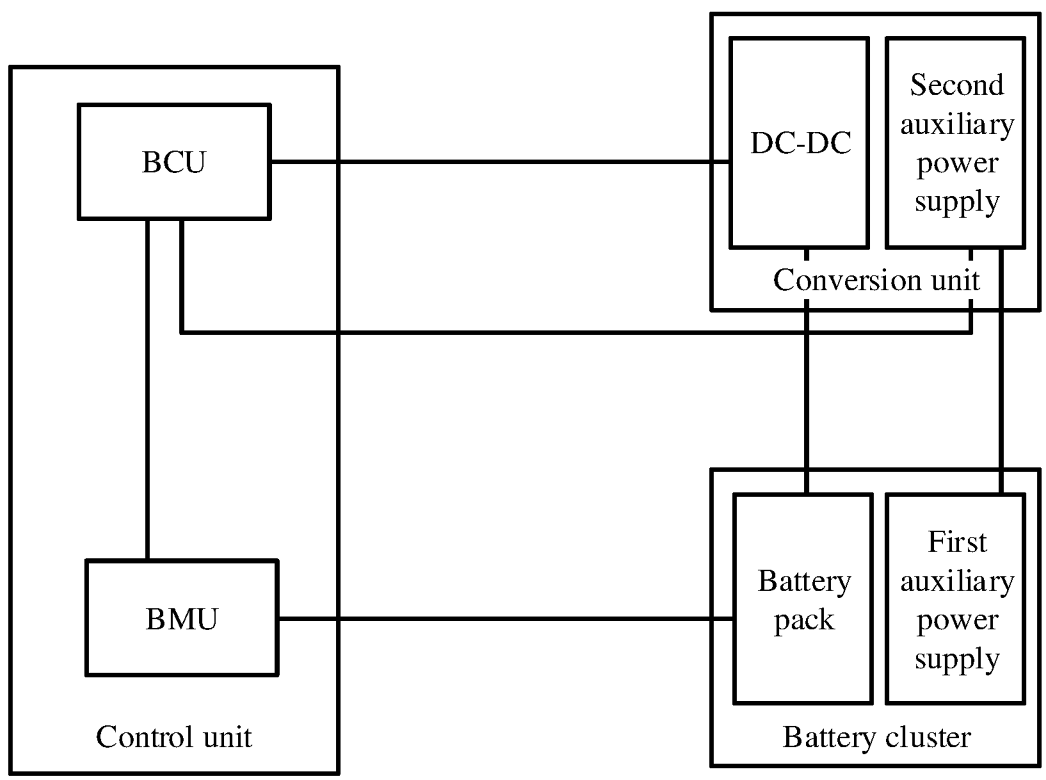
FIG. 6 is a schematic diagram of a structure of an energy storage apparatus including a battery control unit.

FIG. 6 is a schematic diagram of a structure of an energy storage apparatus including a battery control unit. As shown in FIG. 6, after a first auxiliary power supply is started, the first auxiliary power supply enables a second auxiliary power supply to start. The second auxiliary power supply is configured to supply power to the battery control unit in a corresponding control unit. After the battery control unit is powered on, the battery control unit determines whether a black start mode is on; and if the battery control unit is in the black start mode, controls a DC-DC converter in a corresponding conversion unit to release electric energy stored in a battery pack in a corresponding battery cluster, to energize a direct current bus. Specifically, the battery control unit may communicate with a battery management unit, to determine whether the battery control unit already enters the black start mode. Optionally, a battery control unit in each control unit communicates with the battery management unit in at least one of the following manners: a wired local area network (LAN), a serial bus (RS-485), a controller area network (controller area network, CAN) and a power line communication (PLC), a general packet radio service (GPRS), a wireless network, Bluetooth, ZigBee, and infrared.

Optionally, the battery control unit may control connection and disconnection of a switching device in the DC-DC converter by using a control signal. For example, the control signal may be a pulse width modulation (PWM) signal, and is used to adjust, to a target voltage by setting different duty cycles, a voltage that is output by the DC-DC converter. A specific manner of generating the control signal is not limited herein, and this should be known by a person skilled in the art.

Optionally, the switching device in the DC-DC converter may be one or more of a plurality of types of switching devices, such as a relay, a metal oxide semi-conductor field effect transistor, a bipolar junction transistor, an insulated gate bipolar transistor, and a gallium nitride power tube. The plurality of types of switching devices are not listed one by one in this embodiment of this disclosure. Each switching device may include a first electrode, a second electrode, and a control electrode, where the control electrode is configured to control turn-on or turn-off of the switch. When the switch is turned on, a current may be transmitted between the first electrode and the second electrode of the switch. When the switch is turned off, a current cannot be transmitted between the first electrode and the second electrode of the switch. The metal oxide semi-conductor field effect transistor is used as an example. The control electrode of the switch is a gate, the first electrode of the switch may be a source of the switching device, and the second electrode may be a drain of the switching device. Alternatively, the first electrode may be a drain of the switch, and the second electrode may be a source of the switch.

Figure 7A:
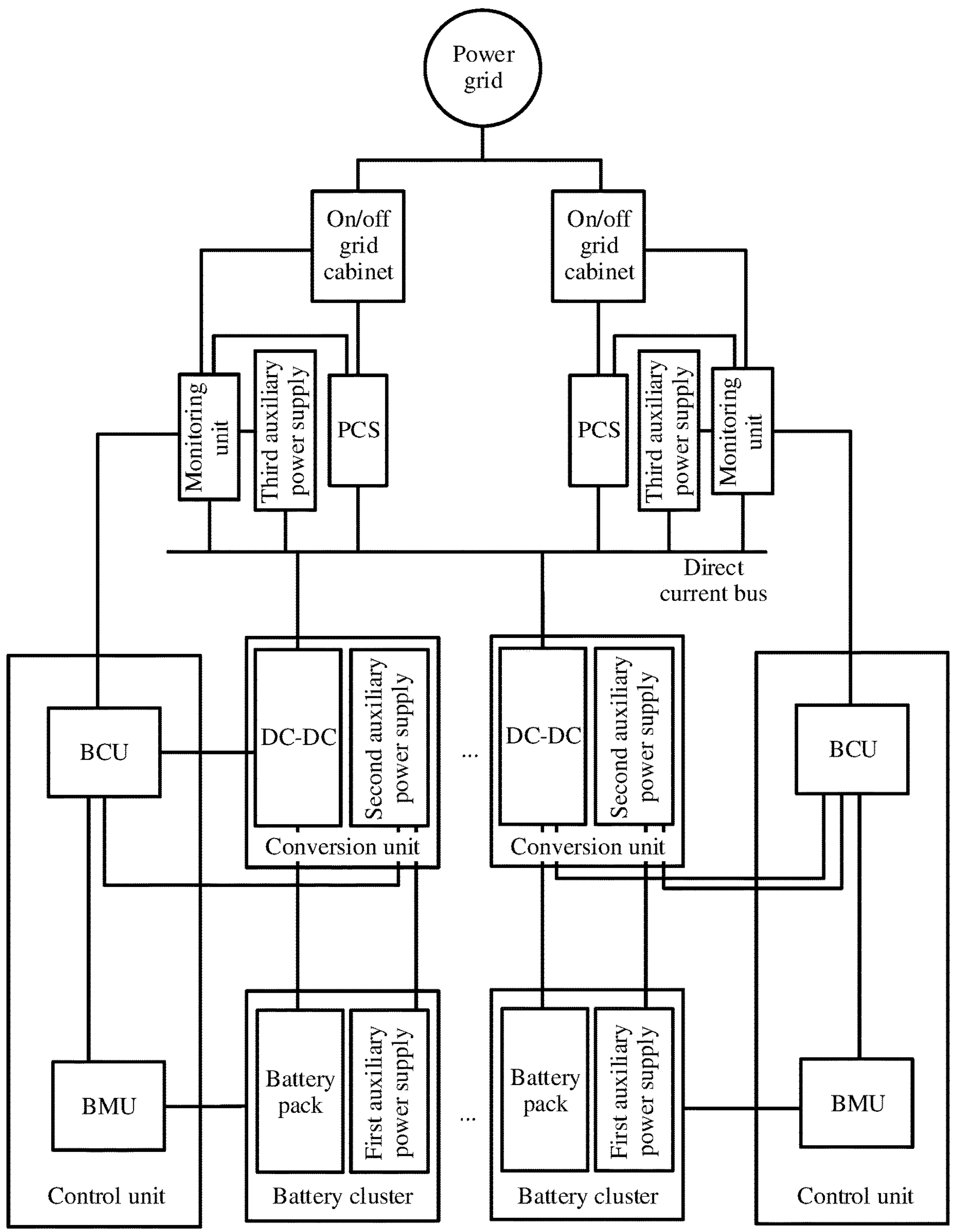
FIG. 7A is a schematic diagram 1 of an entire structure of an energy storage apparatus.

FIG. 7A is a schematic diagram 1 of an entire structure of an energy storage apparatus. As shown in FIG. 7A, in a possible implementation, the energy storage apparatus further includes a plurality of power conversion systems PCSs. The plurality of power conversion systems are in a one-to-one correspondence with the plurality of conversion units. Any one of the plurality of conversion units is mutually connected to any one of the plurality of power conversion systems through the direct current bus.

Optionally, the energy storage apparatus further includes a plurality of on/off grid cabinets, a plurality of third auxiliary power supplies, and a plurality of system control unit SCUs. The plurality of power conversion systems are in a one-to-one correspondence with the plurality of on/off grid cabinets, the plurality of third auxiliary power supplies, and the plurality of system control unit SCUs. Any one of the plurality of third auxiliary power supplies is configured to obtain power from the direct current bus to start the monitoring unit corresponding to the power conversion system. Any battery control unit in the plurality of control units is further configured to: when determining that the black start mode is on, control the DC-DC converter in the conversion unit corresponding to the battery cluster to generate a disturbance signal at a specified frequency on the direct current bus. Any one of the plurality of system control unit is configured to: detect the disturbance signal on the direct current bus and a working state of the on/off grid cabinet corresponding to the power conversion system; and when the disturbance signal at the specified frequency is detected on the direct current bus and the on/off grid cabinet corresponding to the power conversion system is in a normal working state, start the power conversion system and the on/off grid cabinet corresponding to the power conversion system. After the power conversion system and the on/off grid cabinet are normally started, the entire energy storage apparatus is enabled to normally work, and supply power to a power grid, so that power supply to the power grid is restored.

A person skilled in the art should know a manner in which the battery control unit communicates with the monitoring unit, and the manner is not described in detail herein. The monitoring unit may obtain a black start signal from the battery control unit, and after obtaining the black start signal, determine that the black start mode is on. When determining that the black start mode is on, the monitoring unit starts the power conversion system and the on/off grid cabinet.

Figure 7B:
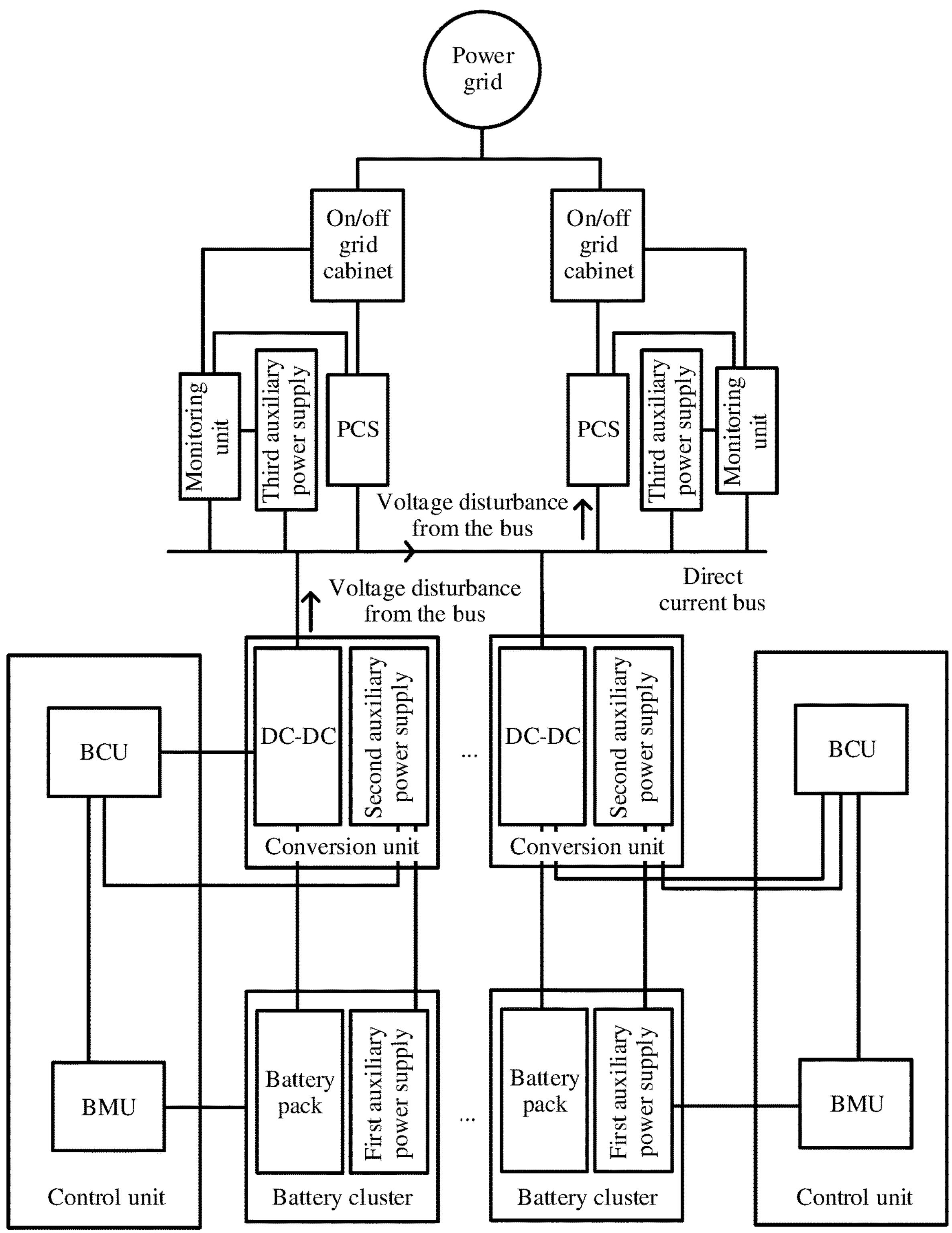
FIG. 7B is a schematic diagram 2 of an entire structure of an energy storage apparatus.

FIG. 7B is a schematic diagram 2 of an entire structure of an energy storage apparatus. As shown in FIG. 7B, in some scenarios, due to costs or distance limit, it is difficult for the battery control unit to communicate with the monitoring unit, and any battery control unit in the plurality of control units is further configured to: when determining that a black start mode is on, control the DC-DC converter in the conversion unit corresponding to the battery cluster to generate a disturbance signal at a specified frequency on the direct current bus. Specifically, the battery control unit controls the DC-DC converter to generate disturbance on the bus, and uses a specific bus voltage disturbance frequency to indicate that the black start mode is on, so that after receiving the bus voltage disturbance, all the system control unit decode the bus voltage disturbance, to determine that the black start mode is on. In some examples, a form of the disturbance may be a rectangular wave, a sawtooth wave, a staircase wave, or the like, and the form of the disturbance is not limited herein.

Figure 7C:
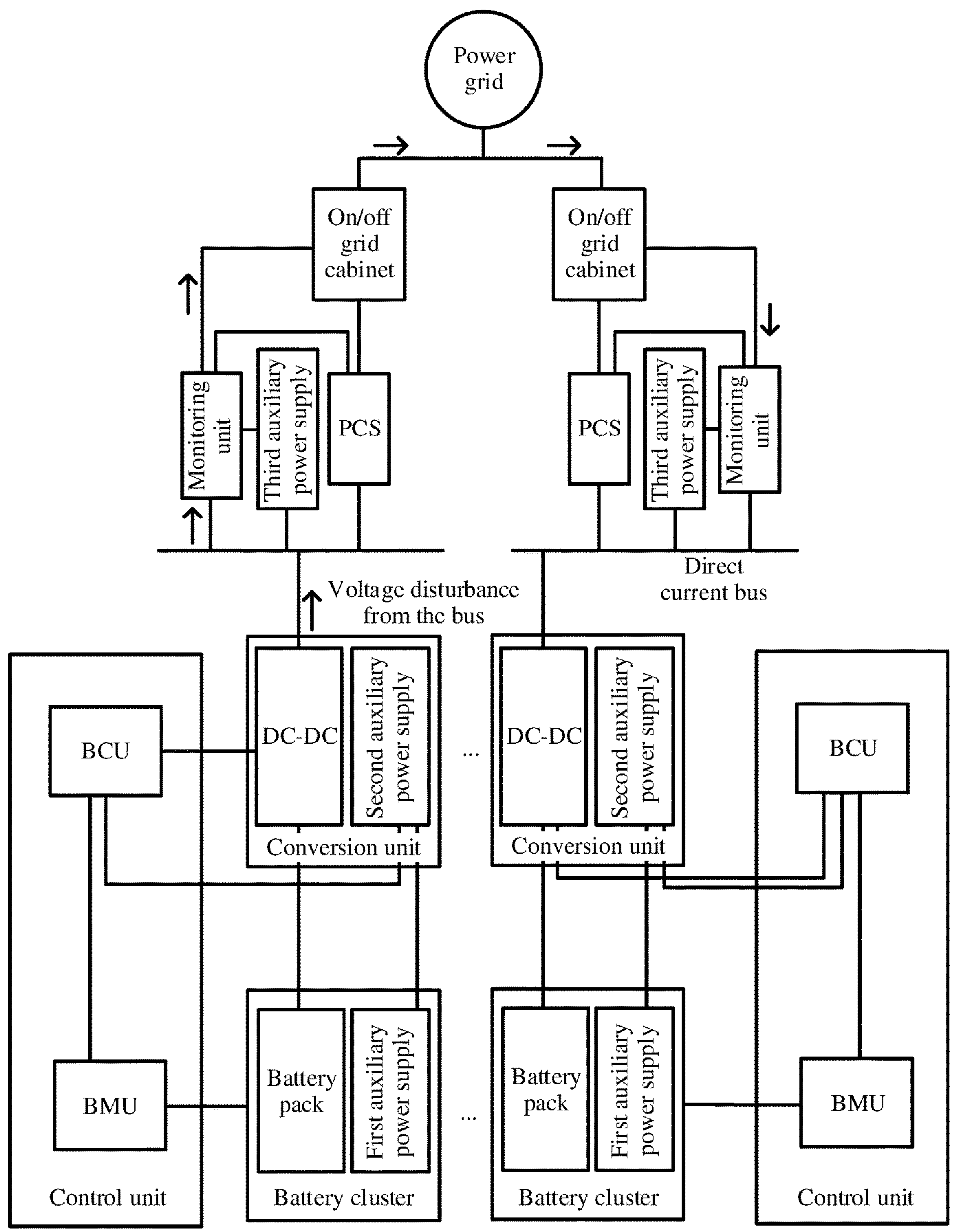
FIG. 7C is a schematic diagram 3 of an entire structure of an energy storage apparatus.

FIG. 7C is a schematic diagram 3 of an entire structure of an energy storage apparatus. As shown in FIG. 7C, when it is difficult for the battery control unit to communicate with the monitoring unit, and on different buses, the DC-DC converters are connected to power conversion systems, in a case that the battery control unit determines that a black start mode is on, the DC-DC converter in the corresponding conversion unit is controlled to generate a disturbance signal at a specified frequency on the direct current bus, and the specific bus voltage disturbance frequency is used to indicate that the black start mode is on. After receiving the foregoing bus voltage disturbance, the monitoring unit connected to the DC-DC converter on one direct current bus decodes the bus voltage disturbance, to determine that the black start mode is on. Other on/off grid cabinets on the power grid are notified, by the on/off grid cabinet that is on the power grid and that corresponds to the monitoring unit, to enter the black start mode, and finally the other on/off grid cabinets perform downstream transmission separately, to enable the entire energy storage apparatus to complete a black start.

An embodiment of this disclosure provides an energy storage apparatus control method, applied to an energy storage apparatus. The energy storage apparatus includes: a plurality of battery clusters, a plurality of conversion units, a start unit, and a controller. The method includes: after receiving a start signal, controlling a control switch in at least one of the plurality of battery clusters to close, to start a control unit corresponding to the battery cluster; determining, based on a state of the control switch in the corresponding battery cluster, whether a black start mode is on, where the black start mode is a mode in which power supply to a power grid needs to be restored after the power grid is powered off; and when determining that the black start mode is on, controlling a DC-DC converter in the corresponding conversion unit to release electric energy stored in a battery pack in the corresponding battery cluster, to energize a direct current bus.

In a possible implementation, the energy storage apparatus further includes a plurality of on/off grid cabinets, a plurality of third auxiliary power supplies, and a plurality of system control unit SCUs. A plurality of power conversion systems are in a one-to-one correspondence with the plurality of on/off grid cabinets, the plurality of third auxiliary power supplies, and the plurality of system control unit SCUs. The power conversion system and the on/off grid cabinet. The power conversion system includes the monitoring unit SCU. The method further includes: detecting a disturbance signal on the direct current bus and a working state of the on/off grid cabinet corresponding to the power conversion system; and when the disturbance signal at a specified frequency is detected on the direct current bus and the on/off grid cabinet corresponding to the power conversion system is in a normal working state, starting the power conversion system and the on/off grid cabinet corresponding to the power conversion system.

It can be concluded from the foregoing embodiment that, based on the energy storage apparatus provided in this embodiment of this disclosure, when the start signal is triggered after the power grid connected to a photovoltaic system is powered off, the start signal is sent to the start unit. After receiving the start signal, the start unit controls the control switch in the at least one of the battery clusters to close, and starts the control unit corresponding to the control switch. The control unit may determine, based on the state of the control switch in the corresponding battery cluster, whether the black start mode is on; and when determining that the black start mode is on, control the DC-DC converter in the corresponding conversion unit to release the electric energy stored in the battery pack in the corresponding battery cluster, so that the direct current bus is energized, thereby implementing a black start without adding an additional device.

Certainly, the foregoing descriptions of the structure of the energy storage apparatus are only an example. In practical application, based on different devices in the battery cluster, the conversion unit, and the start unit, the energy storage apparatus may alternatively use other structures. The other structures are not described one by one herein in this disclosure.

It should be understood that, the foregoing energy storage apparatus and energy storage apparatus control method may also be applied to other fields in which a black start needs to be implemented, such as wind power generation, hydroelectric power generation, and thermal power generation. The black start may be implemented by using the foregoing apparatus and method, to reduce costs of the black start.

Figure 8A:
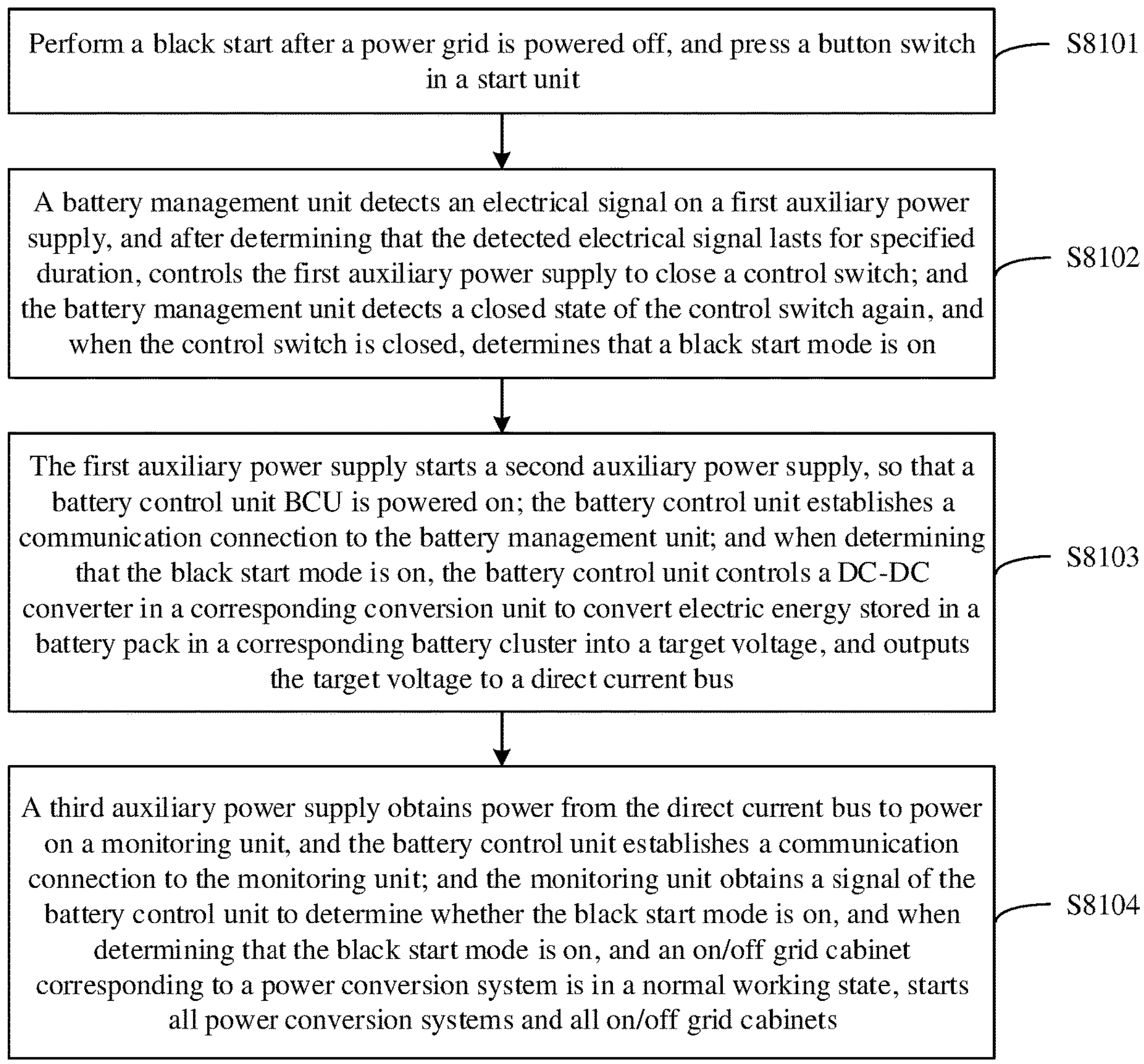
FIG. 8A is a schematic diagram 1 of an energy storage apparatus control method.

Specifically, for the structure of the energy storage apparatus shown in FIG. 7A, the energy storage apparatus may be controlled by performing an energy storage apparatus control method shown in FIG. 8A, thereby implementing a black start. Specifically, the control method mainly includes the following steps.

S8101: Perform a black start after a power grid is powered off, and press a button switch in a start unit.

It should be understood that, after the button switch in the start unit is pressed, a conduction path is formed between a first auxiliary power supply and a battery management unit, so that the first auxiliary power supply supplies power to the battery management unit in a corresponding control unit.

S8102: The battery management unit detects an electrical signal on the first auxiliary power supply, and after determining that the detected electrical signal lasts for specified duration, controls the first auxiliary power supply to close a control switch. The battery management unit detects a closed state of the control switch again, and when the control switch is closed, determines that a black start mode is on.

S8103: The first auxiliary power supply starts a second auxiliary power supply, so that a battery control unit BCU is powered on; the battery control unit establishes a communication connection to the battery management unit; and when determining that the black start mode is on, the battery control unit controls a DC-DC converter in a corresponding conversion unit to convert electric energy stored in a battery pack in a corresponding battery cluster into a target voltage, and outputs the target voltage to a direct current bus S8104: A third auxiliary power supply obtains power from the direct current bus to power on a monitoring unit, and the battery control unit establishes a communication connection to the monitoring unit; and the monitoring unit obtains a signal of the battery control unit to determine whether the black start mode is on, and when determining that the black start mode is on, and an on/off grid cabinet corresponding to a power conversion system is in a normal working state, starts all power conversion systems and all on/off grid cabinets.

Figure 8B:
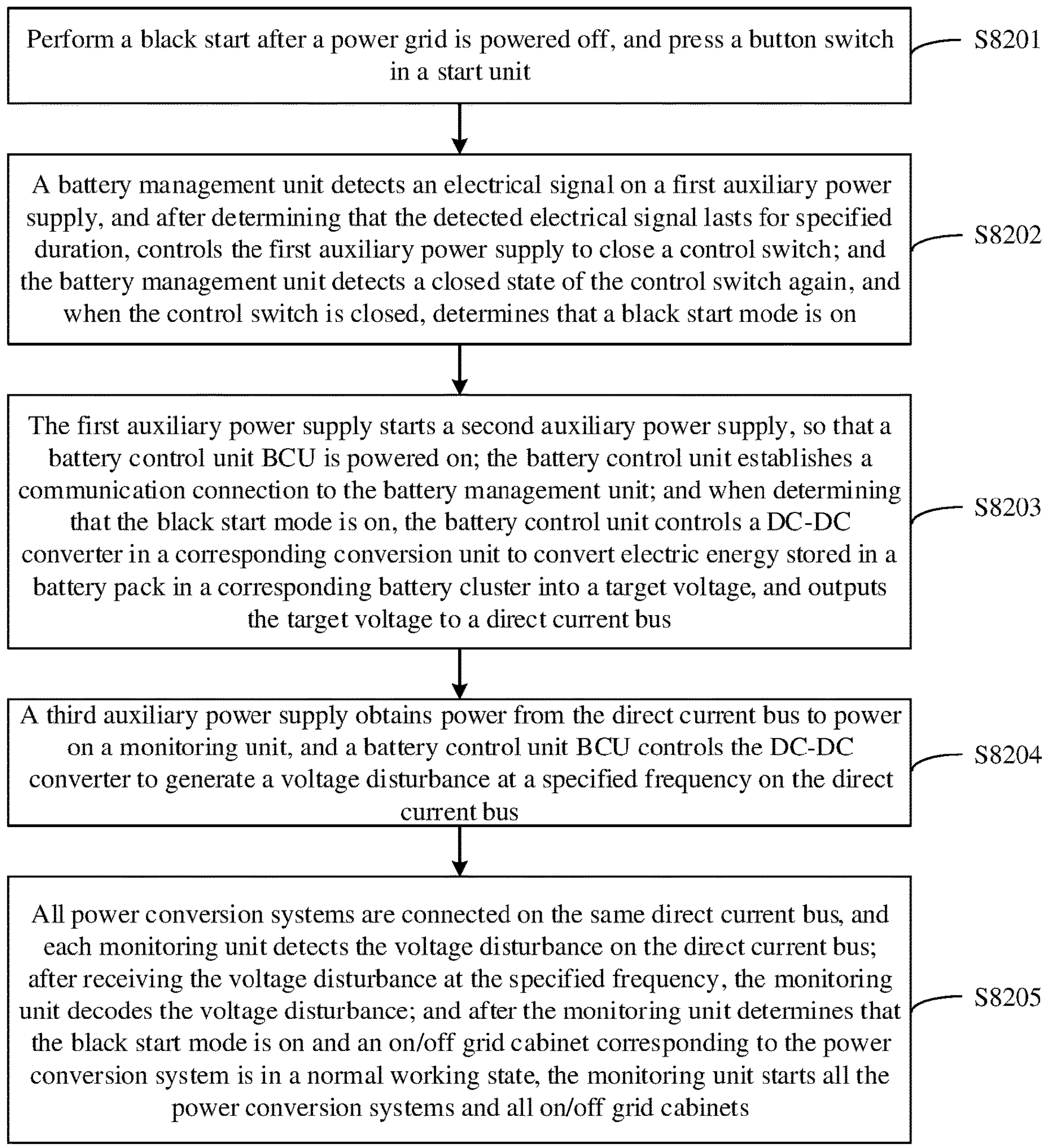
FIG. 8B is a schematic diagram 2 of an energy storage apparatus control method.

For the structure of the energy storage apparatus shown in FIG. 7B, the energy storage apparatus may be controlled by performing an energy storage apparatus control method shown in FIG. 8B, thereby implementing a black start. Specifically, the control method mainly includes the following steps.

The method in step S8201 to step S8203 is the same as the method in S8101 to S8103 shown in FIG. 8A. Details are not described herein again.

Step S8204: A third auxiliary power supply obtains power from the direct current bus to power on a monitoring unit, and the battery control unit BCU controls the DC-DC converter to generate voltage disturbance at a specified frequency on the direct current bus.

Step S8205: All power conversion systems are connected on the same direct current bus, and each monitoring unit detects the voltage disturbance on the direct current bus; after receiving the voltage disturbance at the specified frequency, the monitoring unit decodes the voltage disturbance; and after the monitoring unit determines that the black start mode is on and an on/off grid cabinet corresponding to the power conversion system is in a normal working state, the monitoring unit starts all the power conversion systems and all on/off grid cabinets.

Figure 8C:
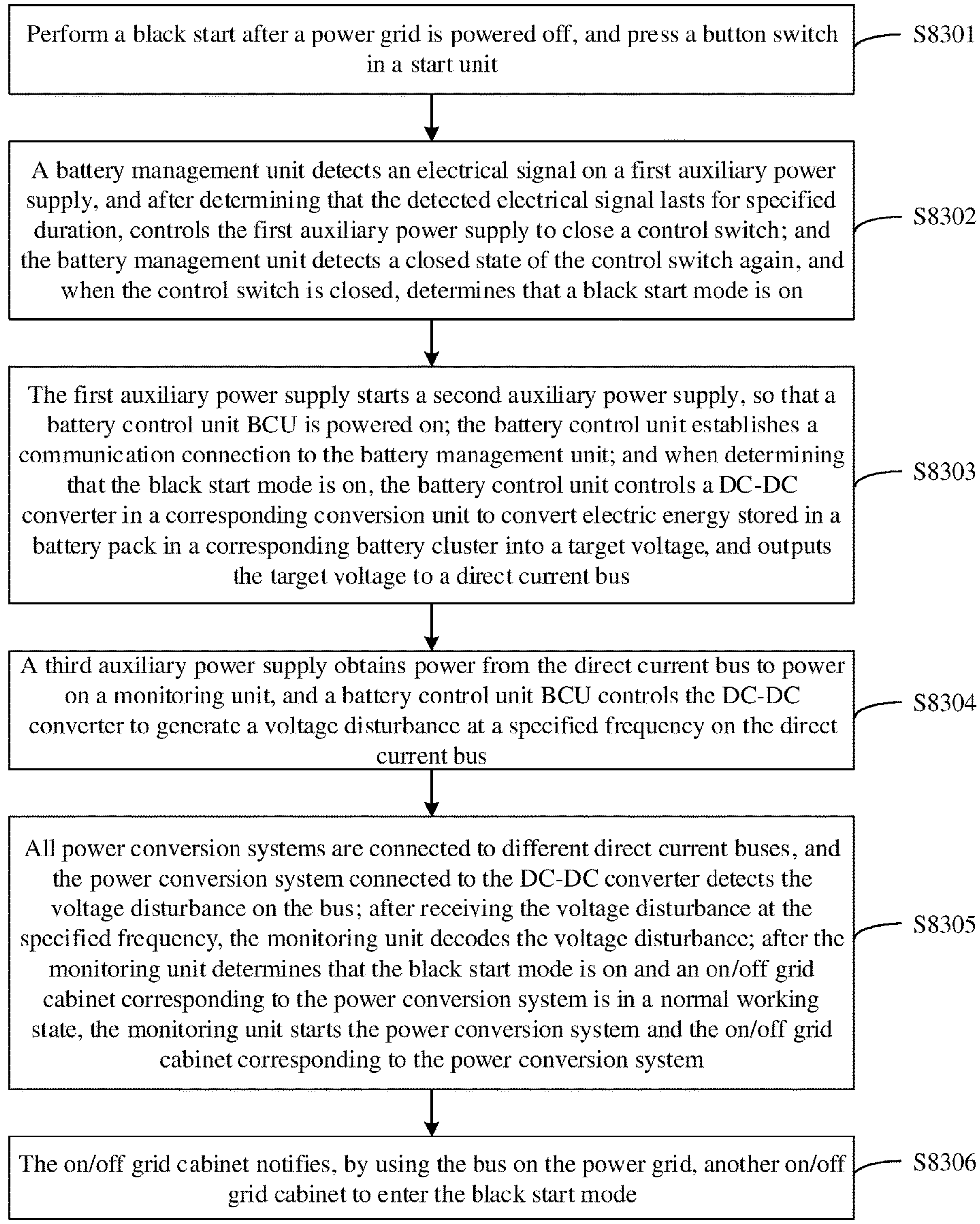
FIG. 8C is a schematic diagram 3 of an energy storage apparatus control method.

For the structure of the energy storage apparatus shown in FIG. 7C, the energy storage apparatus may be controlled by performing an energy storage apparatus control method shown in FIG. 8C, thereby implementing a black start. Specifically, the control method mainly includes the following steps.

The method in step S8301 to step S8303 is the same as the method in S8101 to S8103 shown in FIG. 8A. Details are not described herein again.

Step S8304: A third auxiliary power supply obtains power from the direct current bus to power on a monitoring unit, and the battery control unit BCU controls the DC-DC converter to generate voltage disturbance at a specified frequency on the direct current bus.

Step S8305: All power conversion systems are connected to different direct current buses, and the power conversion system connected to the DC-DC converter detects the voltage disturbance on the bus; after receiving the voltage disturbance at the specified frequency, the monitoring unit decodes the voltage disturbance; after the monitoring unit determines that the black start mode is on and an on/off grid cabinet corresponding to the power conversion system is in a normal working state, the monitoring unit starts the power conversion system and the on/off grid cabinet corresponding to the power conversion system.

Step S8306: The on/off grid cabinet notifies, through the bus on the power grid, another on/off grid cabinet to enter the black start mode.

Figure 9:
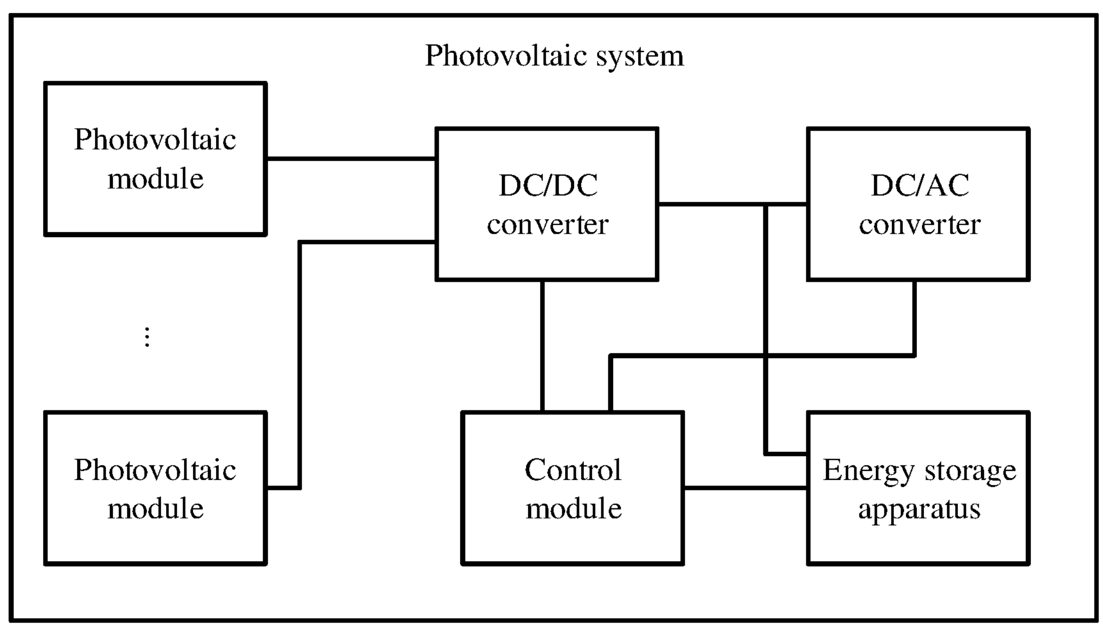
FIG. 9 is a schematic diagram of a structure of a photovoltaic system according to this disclosure.

Based on a same inventive concept, an embodiment of this disclosure provides a photovoltaic system. As shown in FIG. 9, the photovoltaic system includes: a plurality of photovoltaic modules, a direct current to direct current DC-DC converter, and a direct current to alternating current DC-AC converter, a control module, and the energy storage apparatus defined in the foregoing embodiment.

The plurality of photovoltaic modules are connected to the DC-DC converter, and are configured to: convert optical energy into a first direct current, and output the first direct current to the DC-DC converter. The DC-DC converter is separately connected to the DC-AC converter and the energy storage apparatus, and the DC-DC converter is configured to: convert the first direct current into a second direct current, and separately output the second direct current to the DC-AC converter and the energy storage apparatus. The energy storage apparatus is connected to the control module, and the energy storage apparatus is configured to supply power to the control module. The DC-AC converter is configured to: convert the second direct current into a first alternating current, and output the first alternating current. The control module is separately connected to the DC-DC converter and the DC-AC converter, and the control module is configured to control a working state of the DC-DC converter and a working state of the DC-AC converter. In a possible implementation, the control module is further configured to control a working state of the energy storage apparatus.

A person skilled in the art should understand that embodiments of this disclosure may be provided as a method, a system, or a computer program product. Therefore, this disclosure may use a form of a hardware-only embodiment, a software-only embodiment, or an embodiment with a combination of software and hardware. Moreover, this disclosure may use a form of a computer program product that is implemented on one or more computer-usable storage media (including but not limited to a magnetic disk memory, a CD-ROM, an optical memory, and the like) that include computer-usable program code.

It should be understood based on the flowcharts and/or the block diagrams of the method, the device (the system), and the computer program product according to this disclosure that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or any other programmable data processing device, so that a series of operations and steps are performed on the computer or any other programmable device, to generate computer-implemented processing. Therefore, the instructions executed on the computer or any other programmable device provide steps for implementing a specific function in one or more processes in the flowcharts and/or in one or more blocks in the block diagrams.

It is clear that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. An energy storage apparatus configured to supply power to a power grid;

the energy storage apparatus comprises:

a plurality of battery clusters;

a plurality of conversion units;

a start unit;

a controller wherein the power grid is configured to supply power to the controller, the controller comprises a plurality of control units, the plurality of battery clusters are in a one-to-one correspondence with the plurality of control units and the plurality of conversion units, each battery cluster is connected to a corresponding conversion unit, each battery cluster comprises a battery pack and a control switch, each conversion unit comprises a direct current to direct current DC-DC converter, each DC-DC converter is connected to a direct current bus;

the start unit is configured to: after receiving a start signal, control the control switch in at least one of the plurality of battery clusters to close, to start a control unit corresponding to the at least one battery cluster; and any one of the plurality of control units is configured to: detect, based on a state of the control switch in the corresponding battery cluster, whether a black start mode is on; and when the black start mode is on, control the DC-DC converter in the corresponding conversion unit to release electric energy stored in the battery pack in the corresponding battery cluster, to energize the direct current bus, wherein the black start mode is a mode in which power supply to the power grid needs to be restored after the power grid is powered off.

2. The energy storage apparatus according to claim 1, wherein each control unit comprises a battery management unit BMU; and any battery management unit in the plurality of control units is configured to: detect the state of the control switch in the battery cluster corresponding to the control unit; determine whether the black start mode is on; and when the control switch in the battery cluster corresponding to the control unit is closed, determine that the black start mode is on.

3. The energy storage apparatus according to claim 2, wherein each battery cluster further comprises: a first auxiliary power supply; in each battery cluster, a first electrode of the control switch is connected to one end of the first auxiliary power supply, a second end of the battery pack is connected to the other end of the first auxiliary power supply, the first electrode of the control switch is further connected to the start unit, a second electrode of the control switch is separately connected to a first end of the battery pack and the start unit, and a control electrode of the control switch is connected to the first auxiliary power supply; and the first auxiliary power supply in any one of the plurality of battery clusters is configured to: after the control switch in the battery cluster is closed, supply power to a battery management unit in the control unit corresponding to the battery cluster.

4. The energy storage apparatus according to claim 3, wherein each conversion unit further comprises a second auxiliary power supply; the first auxiliary power supply in any one of the plurality of battery clusters is connected to the second auxiliary power supply in the conversion unit corresponding to the battery cluster; each control unit comprises a battery control unit BCU;

the first auxiliary power supply in any one of the plurality of battery clusters is further configured to start the second auxiliary power supply in the conversion unit corresponding to the battery cluster;

the second auxiliary power supply in any one of the plurality of conversion units is configured to supply power to the battery control unit in the control unit corresponding to the battery cluster; and any battery control unit in the plurality of control units is configured to: when determining that the black start mode is on, control the DC-DC converter in the conversion unit corresponding to the battery cluster to release the electric energy stored in the battery pack in the corresponding battery cluster, to energize the direct current bus.

5. The energy storage apparatus according to claim 4, wherein the battery control unit in each control unit communicates with the battery management unit in at least one of the following manners: a wired local area network LAN, a serial bus, a controller area network CAN and a power line carrier PLC, a general packet radio service GPRS, a wireless network Wi-Fi, Bluetooth, ZigBee, or infrared.

6. The energy storage apparatus according to claim 1, wherein the energy storage apparatus further comprises a plurality of power conversion systems PCSs, wherein the plurality of power conversion systems are in a one-to-one correspondence with the plurality of conversion units; and any one of the plurality of conversion units is mutually connected to any one of the plurality of power conversion systems through the direct current bus.

7. The energy storage apparatus according to claim 6, wherein the energy storage apparatus further comprises a plurality of on/off grid cabinets, a plurality of third auxiliary power supplies, and a plurality of system control unit SCUs; and the plurality of power conversion systems are in a one-to-one correspondence with the plurality of on/off grid cabinets, the plurality of third auxiliary power supplies, and the plurality of system control unit SCUs;

any one of the plurality of third auxiliary power supplies is configured to obtain power from the direct current bus to start the monitoring unit corresponding to the power conversion system;

any battery control unit in the plurality of control units is further configured to: when determining that the black start mode is on, control the DC-DC converter in the conversion unit corresponding to the battery cluster to generate a disturbance signal at a specified frequency on the direct current bus; and any one of the plurality of system control unit is configured to: detect the disturbance signal on the direct current bus and a working state of the on/off grid cabinet corresponding to the power conversion system, and when the disturbance signal at the specified frequency is detected on the direct current bus and the on/off grid cabinet corresponding to the power conversion system is in a normal working state, start the power conversion system and the on/off grid cabinet corresponding to the power conversion system.

8. The energy storage apparatus according to claim 1, wherein the start unit comprises a button switch, wherein the button switch is connected in parallel to any one or more of control switches in the plurality of battery clusters.

9. The energy storage apparatus of claim 1 further comprising:

a photovoltaic system comprising:

a plurality of photovoltaic modules, a direct current to direct current DC-DC converter, a direct current to alternating current DC-AC converter, wherein the plurality of photovoltaic modules are connected to the DC-DC converter, and the plurality of photovoltaic modules are configured to: convert optical energy into a first direct current, and output the first direct current to the DC-DC converter;

the DC-DC converter is separately connected to the DC-AC converter and the energy storage apparatus, and the DC-DC converter is configured to: convert the first direct current into a second direct current, and separately output the second direct current to the DC-AC converter and the energy storage apparatus;

the energy storage apparatus is connected to the control module, and the energy storage apparatus is configured to supply power to the control module;

the DC-AC converter is configured to: convert the second direct current into an alternating current, and output the alternating current; and the control module is separately connected to the DC-DC converter and the DC-AC converter, and the control module is configured to control a working state of the DC-DC converter and a working state of the DC-AC converter.

10. The energy storage apparatus according to claim 9, wherein the control module is further configured to control a working state of the energy storage apparatus.

11. An energy storage apparatus control method for an energy storage apparatus, wherein the energy storage apparatus comprises a plurality of battery clusters, a plurality of conversion units, a start unit, and a controller; and the method comprises:

after receiving a start signal, controlling a control switch in at least one of the plurality of battery clusters to close, to start a control unit corresponding to the battery cluster;

detecting, based on a state of the control switch in the corresponding battery cluster, whether a black start mode is on, wherein the black start mode is a mode in which power supply to a power grid needs to be restored after the power grid is powered off; and when the black start mode is on, controlling a DC-DC converter in the corresponding conversion unit to release electric energy stored in a battery pack in the corresponding battery cluster, to energize a direct current bus.

12. The energy storage method according to claim 11, wherein the energy storage apparatus further comprises a plurality of on/off grid cabinets, a plurality of third auxiliary power supplies, and a plurality of system control unit SCUs; and the plurality of power conversion systems are in a one-to-one correspondence with the plurality of on/off grid cabinets, the plurality of third auxiliary power supplies, and the plurality of system control unit SCUs; and the method further comprises:

detecting a disturbance signal on the direct current bus and a working state of the on/off grid cabinet corresponding to the power conversion system; and when the disturbance signal at a specified frequency is detected on the direct current bus and the on/off grid cabinet corresponding to the power conversion system is in a normal working state, starting the power conversion system and the on/off grid cabinet corresponding to the power conversion system.

* * * * *